No. 748,773. PATENTED JAN. 5, 1904.
O. H. MUNTZ.
PAD HOOK.
APPLICATION FILED MAY 13, 1903.
NO MODEL.
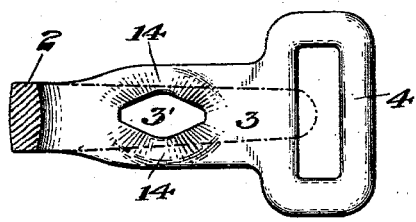
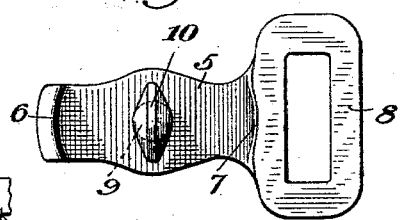
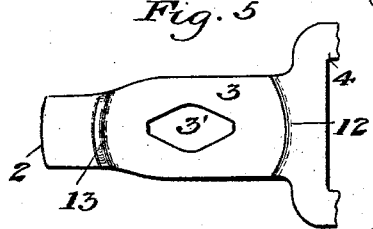
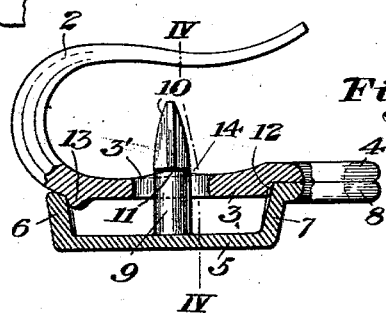
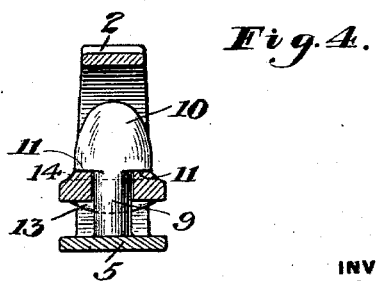
WITNESSES
INVENTOR
O. H. Muntz No. 748,773. Patented January 5, 1904.

UNITED STATES PATENT OFFICE.

OLIVER H. MUNTZ, OF GREENVILLE, PENNSYLVANIA.

PAD-HOOK.

SPECIFICATION forming part of Letters Patent No. 748,773, dated January 5, 1904.

Application filed May 13, 1903. Serial No. 156,957. (No model.)

*To all whom it may concern:*

Be it known that I, OLIVER H. MUNTZ, of Greenville, in the county of Mercer and State of Pennsylvania, have invented a new and useful Pad-Hook, of which the following is a full, clear, and exact description, reference being had to the accompanying drawings, forming part of this specification, in which—

Figure 1 is a top plan view of the upper or hook member with a part of the hook broken away. Fig. 2 is a top plan view of the lower or bar member. Fig. 3 is a sectional side elevation showing the parts assembled in operative position. Fig. 4 is a cross-section on the line IV IV of Fig. 3, and Fig. 5 is a partial bottom plan view of the hook member.

My invention relates to the class of pad-hooks or rein-hooks, and is designed to produce a hook of this character which can be sewed in by machine, the parts being so arranged that when the lower part is sewed in and the hook placed in position the insertion of the back-band will lock it and prevent its turning out of proper position.

In the drawings, 2 represents the upper half or hook member of the hook, the shank 3 of which is provided with a diamond-shaped hole 3' and an integral loop 4 at its end, this loop extending at right angles to the shank. The lower half or bar member 5 of the hook consists of a bar having upwardly-projecting oppositely-inclined flanges 6 and 7 at its ends, the flange 7 having a loop 8 of a size corresponding to the loop 4. A pin or bolt 9 is formed integrally with the bar 5 at an intermediate point, this bolt projecting upwardly and having a flattened head 10, which is elongated sidewise, producing shoulders 11 at its lower edges. The bolt-head is V-shaped so that it will slip through the hole 3' when the two halves are substantially at right angles to each other, and when the parts are turned into parallelism the head will extend crosswise of the slot, and thus hold the parts together. In order to provide against relative movement of the parts endwise, I provide lower curved or arc-shaped shoulders 12 and 13 on the lower face of the upper member and which coact with the flanges 6 and 7 to prevent shifting of the parts. The upper edge of the flange 6 is preferably beveled slightly, and the curved shape of the shoulders allows the part to be swung into alinement. I also preferably provide a reverse inclined portion 14 around the hole in the upper part, so that as the parts are turned the engagement of the hook on the incline will bind the parts.

In using the device the lower part or half is sewed into the layer and when finished the upper half is placed over the head of the bolt, which is slipped through the hole, and the parts are then turned into alinement. In this position the insertion of the back-band in the mating loops locks the two parts and prevents them getting out of position.

The advantages of my invention result from the simple, cheap, and effective manner of locking the two parts together. The bolt, with its head, may be formed integral with the lower half, and its head serves to prevent accidental throwing out of the checkrein, as well as to lock the parts together.

Many variations may be made in the form and arrangement of the two parts or halves, the relative arrangement of the pin or bolt and the slot, and the other parts without departing from my invention.

I claim—

1. A pad-hook having a hook member with a shank having an elongated hole, and a separate bar member having a bolt secured thereto and provided with a rein-retaining head arranged to slip through the hole in the hook-shank, and interlock the members when turned; substantially as described.

2. A pad-hook comprising a hook having a shank with an elongated hole and an end loop and a lower bar arranged to be sewed in the material, said bar having an upwardly-projecting bolt with a rein-retaining head arranged to slip through the hole and bind the parts together when turned, said bar having an end loop arranged to register with the hook-loop; substantially as described.

3. A pad-hook comprising a hook member having an end loop, and an elongated hole in its shank, and a bar member having end flanges one provided with an end loop, said bar member having a bolt with a rein-retaining head arranged to slip through the hole in the hook-shank and bind the parts together when turned; substantially as described.

4. A pad-hook comprising a hook member with an elongated hole in its shank, and a bar member having a bolt with a rein-retaining head arranged to slip through the hole and interlock the parts when turned, the hook member having an incline arranged to bind the parts together; substantially as described.

5. A pad-hook comprising a hook member with an end loop, an elongated hole in its shank, and shoulders on the lower face of the shank, and a bar member having end flanges arranged to coact with the shoulders, said bar member having an end loop and a bolt with a flattened head arranged to slip through the hole in the shank and interlock the parts when turned into parallelism; substantially as described.

6. A pad-hook comprising a hook member with a shank having an elongated hole and arc-shaped shoulders substantially concentric therewith, and a bar member having a headed stud and arc-shaped flanges concentric therewith, said headed stud adapted to pass through the hook-orifice and interlock said members with their respective arc-shaped portions in contact; substantially as described.

In testimony whereof I have hereunto set my hand.

OLIVER H. MUNTZ.

Witnesses:
H. L. KECK,
C. H. MUNTZ.